United States Patent [19]
Lundquist

[11] Patent Number: 5,666,769
[45] Date of Patent: Sep. 16, 1997

[54] SUPPORTING ELEMENT

[75] Inventor: Lars-Olof Lundquist, Karlstad, Sweden

[73] Assignee: Nivell System Aktiebolag, Mariestad, Sweden

[21] Appl. No.: 556,971

[22] PCT Filed: Jun. 16, 1994

[86] PCT No.: PCT/SE94/00589

§ 371 Date: Dec. 8, 1995

§ 102(e) Date: Dec. 8, 1995

[87] PCT Pub. No.: WO95/00732

PCT Pub. Date: Jan. 5, 1995

[30] Foreign Application Priority Data

Jun. 17, 1993 [SE] Sweden ................... 9302090

[51] Int. Cl.⁶ ................................................. E04C 3/04
[52] U.S. Cl. .................. 52/126.1; 52/126.4; 52/365; 52/370; 52/480; 248/188.4; 248/300; 248/346.04
[58] Field of Search ................... 52/126.4, 126.1, 52/480, 365, 370; 248/300, 316.1, 346.04, 346.05, 188.4, 650

[56] References Cited

U.S. PATENT DOCUMENTS 1,596,039  8/1926  Whittaker .

FOREIGN PATENT DOCUMENTS

| 668 816 | 1/1989 | Switzerland . |
|---|---|---|
| 2185048 | 7/1987 | United Kingdom . |
| WO 85/04441 | 10/1985 | WIPO . |
| WO 92/16701 | 10/1992 | WIPO . |

Primary Examiner—Christopher Todd Kent
Attorney, Agent, or Firm—Nixon & Vanderhye P.C.

[57] ABSTRACT

A supporting element for supporting a construction on a supporting surface includes a bearing part with an inner section and two outer, bending resistant sections, spacer screws keeping the bearing part at a distance from the supporting surface, and clamping members extending upwardly from the outer sections to define a space for the receipt of an element of the construction. The inner section is bendable by the influence of the construction element load, and the clamping plates are located in a plane perpendicular to the construction element. The clamping plates press, in free engagement, against the opposite sides of the construction element with clamping forces generated by the construction element load on the bendable inner section.

18 Claims, 3 Drawing Sheets

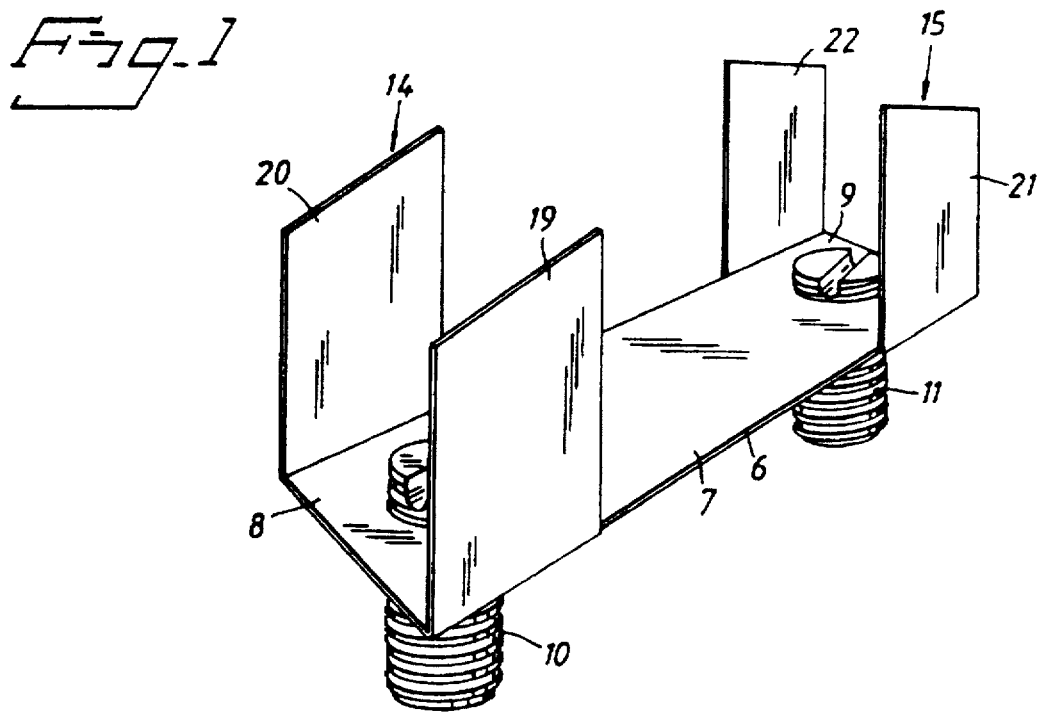
Fig. 1
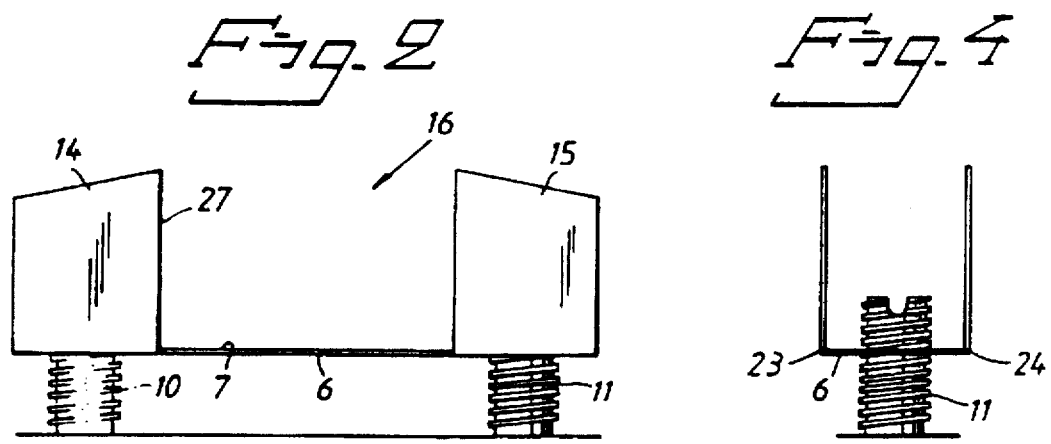
Fig. 2
Fig. 4
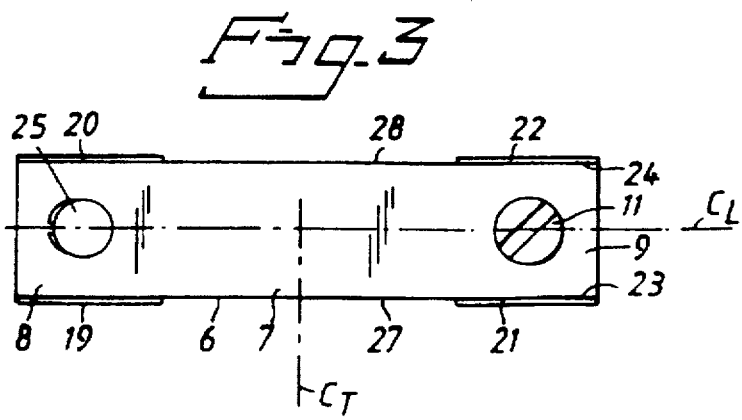
Fig. 3

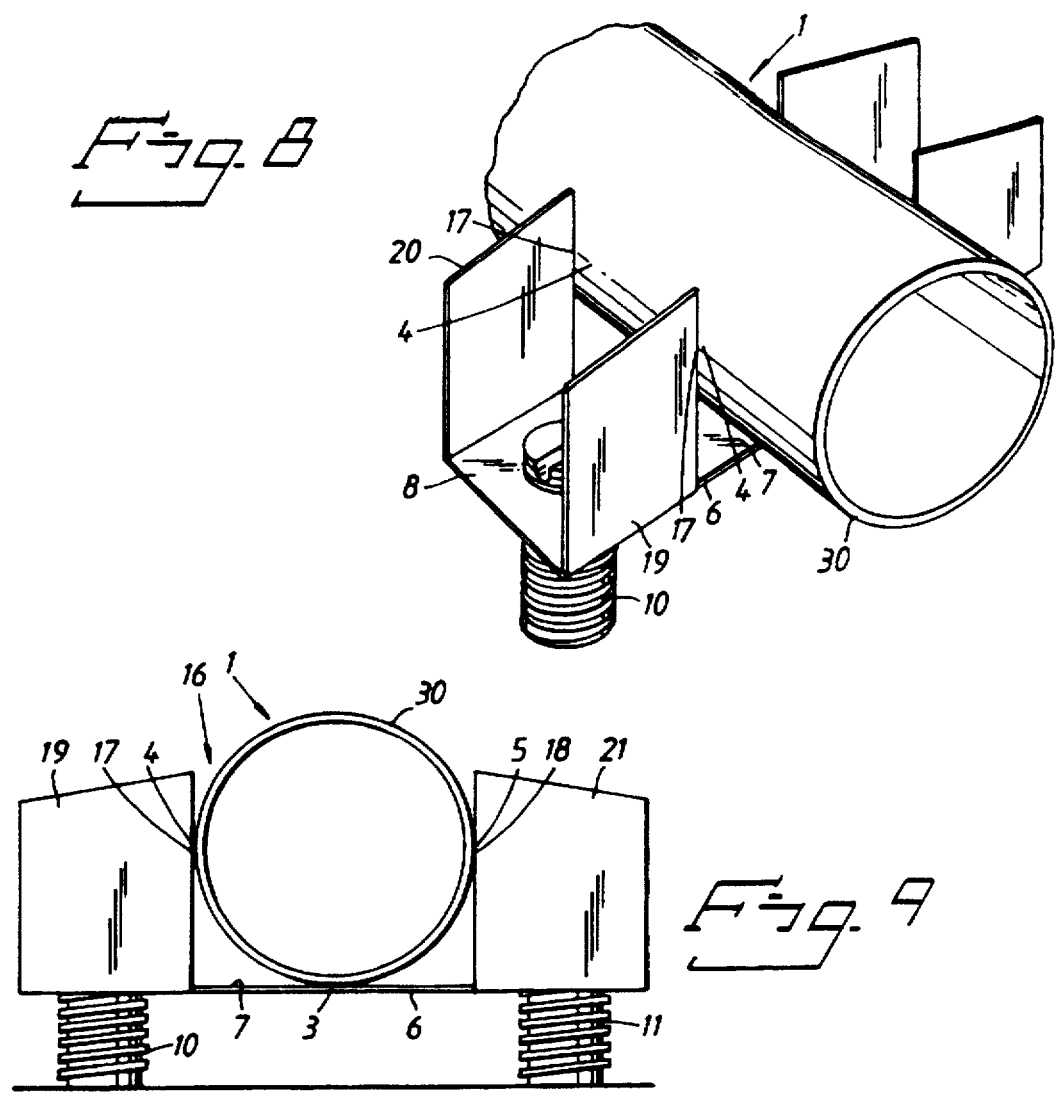
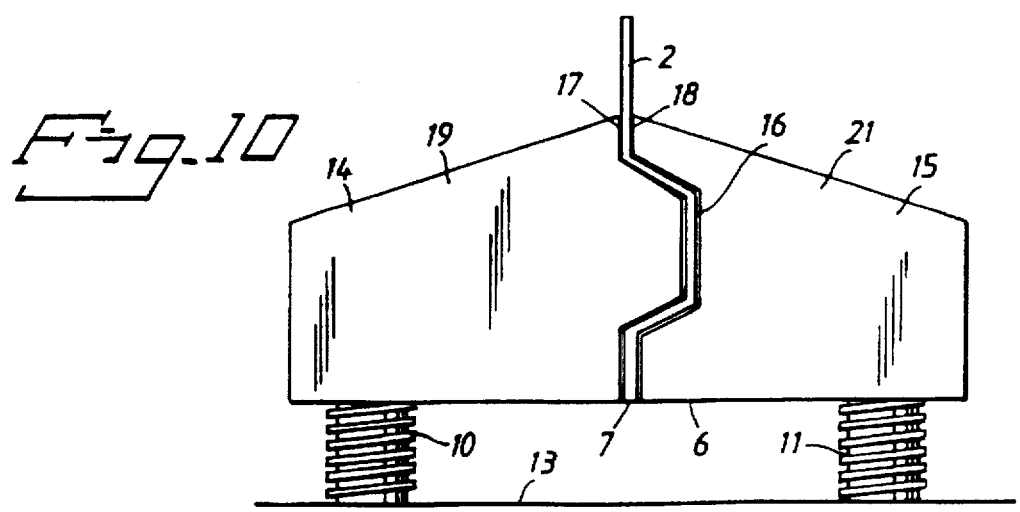

SUPPORTING ELEMENT

CROSS REFERENCE TO RELATED APPLICATION

The present invention relates to a device for supporting a construction on a supporting surface, the construction including at least one form stable construction element having a lower side and two lateral surfaces facing away from each other and being a predetermined distance f apart, with which element the device shall be brought into engagement. The device includes a bearing part with an inner section and two outer, bending resistant sections arranged one on each side of the inner section. A spacer is provided on the lower side of the bearing part in each outer section, and they are arranged to keep the bearing part at a distance from the supporting surface. The construction further includes upwardly directed, co-operating clamping members permanently arranged on the upper side of the bearing part forming a stable unit therewith, wherein the clamping members define a space between them that reaches down to the inner section, for the receipt of the construction element.

Special construction elements in the form of holders, placed on the ground, are used for positioning base elements for the foundation of a building. To obtain the correct level of the base element a foot plate of specific height must generally be cast for each holder. This method is both time-consuming and laborious and does not always ensure an exact level of the base elements. An alternative method is to use inserts to achieve the correct level, but there is a risk of the holder slipping off the insert since the insert is not usually secured to the holder.

The object of the present invention is to provide a device for supporting a construction, e.g. a holder and base element of the type described, which eliminates the problems mentioned above and can be applied quickly and simply to the construction, thereby retaining it and adjusting the construction at a desired level.

The device according to the invention includes an inner section that is bendable by the influence of the load of the construction element, and a clamping member extending within each outer section, which consists of at least one rigid clamping plate with a plane perpendicular to the space and to the construction element. The clamping plates are arranged to press, in free engagement, against the opposite lateral surfaces of the construction element with clamping forces generated by the construction in the loading on the bendable inner section.

The device according to the invention can be used to support and preferably also to adjust the level of a number of different types of constructions comprising construction elements in the form of e.g. molds used when casting concrete floors; joists, used when laying floors indoors to carry wooden tiles or boards; walls to be erected and aligned; levelling planks used, for instance, when levelling the surface for tiling; base elements or holders therefor, and other types of molds or beams that must be adjusted vertically; pipes for various purposes; spacer elements used when forming roofs; and screeds for carrying equipment to be used for surface levelling when casting concrete floors and roofs.

BRIEF DESCRIPTION OF THE DRAWINGS

The invention will be described further with reference to the accompanying drawings.

FIG. 1 is a perspective view of a device in the form of a supporting and levelling element for supporting and adjusting the level of a construction.

FIGS. 2–4 are different plane views of the supporting and levelling element.

FIGS. 8 and 9 are a perspective view and an end view, respectively, of the supporting and levelling element according to FIG. 1, carrying a cylindrical pipe.

FIG. 10 is a side view of a supporting and levelling element according to another embodiment, for a screed of specific design.

DETAILED DESCRIPTION OF THE DRAWINGS

Figure 5:
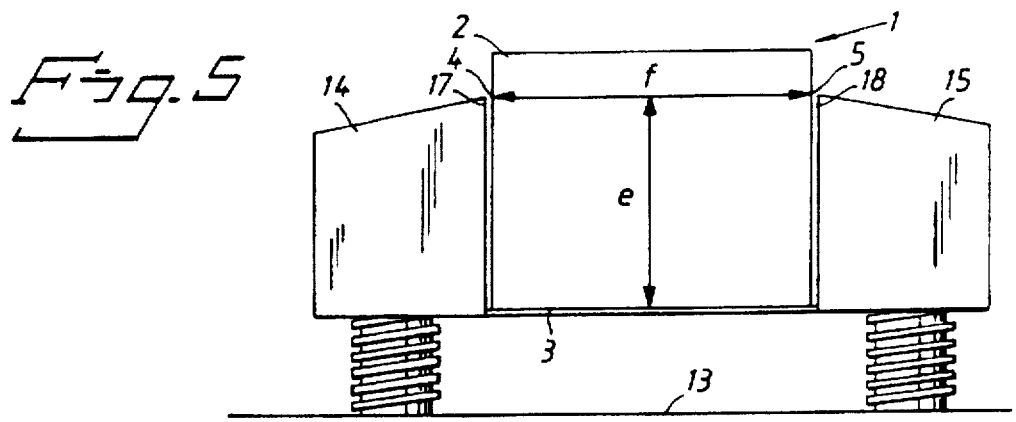
FIG. 5 is a side view of the supporting and levelling element according to FIG. 1 during receipt of a construction element in the form of a beam with rectangular cross section, before the beam has loaded the supporting and levelling element.
Figure 6:
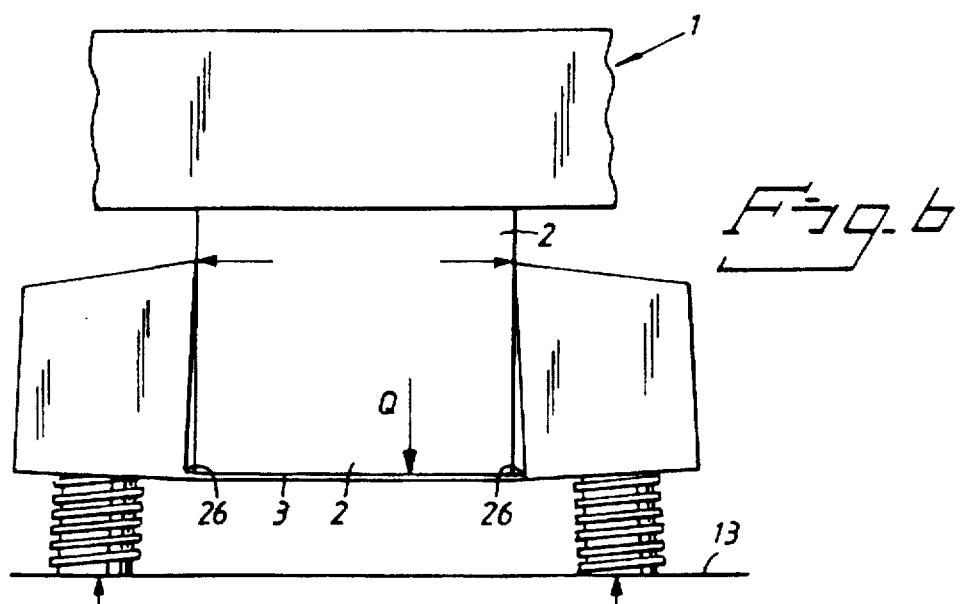
FIG. 6 is a side view of the supporting and levelling element supporting, inter alia, the beam according to FIG. 5 and illustrating the effect when the construction loads the supporting and levelling element.

With reference to FIGS. 1–6 of the drawings they show a device according to the invention for supporting a construction 1 at a desired level above a supporting surface 13 (see particularly FIGS. 5 and 6). The device may be generally designated a supporting element, or a combined supporting and levelling element. Such a construction 1, acting on the device with a load Q, comprises a lower rigid, i.e. form stable, construction element 2 with a bottom surface 3 for cooperation with the supporting element and two lateral surfaces 4, 5 facing away from each other, also for cooperation with the supporting element. The lateral surfaces 4, 5 are situated at a predetermined perpendicular distance e above the bottom surface 3 and at a predetermined distance f from each other. The distance f thus forms the horizontal thickness or width of the solid body 2 within at least the area of the lateral surfaces 4, 5. The distance e is preferably the same for both lateral surfaces 4, 5, as shown in FIG. 5. It will be understood that the size and shape of the supporting and levelling element is adjusted to the particular construction element for which it is to be used. The construction element may have basically any cross-sectional shape.

The supporting element comprises a unitary bearing part 6, i.e. it is undivided or in one piece, in the shape of a plate with an inner or mid-section 7 and two outer rigid sections 8, 9 arranged one on each side of the mid-section. The bearing part 6 has a dimension or extension that when the supporting element is in use, is perpendicular, or substantially perpendicular to the construction element 2 and is generally horizontal. The supporting element also comprises a spacer 10, 11 in each outer section 8, 9. The two spacers 10, 11 are spaced from the mid-section 7 and are joined to the bearing part 6 from which they extend downwardly to rest on the supporting surface 13. In the embodiment shown each spacer 10, 11 consists of a screw extending through the bearing part 6 and can be screwed through the bearing part 6 in order to increase or decrease the distance of the bearing part 6 to the supporting surface 13 so that the construction 1 acquires a desired and also necessary level above the supporting surface 13. Each screw 10 may be provided with a central recess the bottom of which offers support for the head of an attachment member such as a nail or screw when the attachment member is used to anchor the supporting element to the surface 13 via the screws 10, 11. The supporting element also comprises two co-operating clamping members 14, 15 arranged one on each side of the mid-section 7 of the bearing part 6. Each clamping member 14, 15 is rigidly joined to the outer sections 8, 9 of the bearing part 6, and extends upward from the bearing part 6. The clamping members 14, 15 and bearing part 6 define a space 16 between them that is thus located above the mid-section 7 of the bearing part 6 and is freely open upward and at the ends for the receipt of the construction element 2, which will thus be situated between the clamping members 14, 15, resting on the mid-section 7 of the bearing part 6. Each clamping member 14, 15 has at least one upper clamping part 17, 18 that limits the space 16 laterally so that its width on a level with these clamping parts 17, 18 is equal to or substantially equal to or somewhat larger than the dimension f of the construction element 2 when the supporting element is unloaded and the bearing part is uncurved and plane. The width of the space 16 may suitably be from close to 0 mm to 10 mm, preferably 1–5 mm, greater than the dimension f. This ensures that the construction element 2 can easily be received in the space 16 and that the clamping members 14, 15 can be brought into abutment position with the lateral surfaces 4, 5 of the construction element 2, as explained below. The clamping members 14, 15 are non-deformable, at least in their clamping direction which is perpendicular to the construction element 2, so that the necessary clamping forces can be exerted on the lateral surfaces 4, 5 of the construction element. In the embodiment shown, each clamping member 14, 15 consists of two parallel clamping plates 19, 20; 21, 22 extending upwardly from the lateral edges of the outer section 8, 9. The bearing part 6 and clamping plates 19, 20; 21, 22 of the supporting element are produced in one piece from a flat sheet-metal blank punched with two U-shaped recesses 27, 28 and then bent along two parallel scoring lines 23, 24 so that the clamping plates 19, 20; 21, 22 are perpendicular to the flat bearing part 6. The supporting element is symmetrical both as regards the longitudinal vertical central plane $C_L$ extending through the two outer sections 8, 9 of the bearing part 6, and as regards the transverse vertical central plane $C_T$. The outer sections 8, 9 of the bearing part 6 are provided with circular holes 25, the edges of which have been cut and bent to provide thread engagement for the adjustment screws 10, 11. By turning the screws 10, 11 in one direction or the other, the vertical position of the supporting element is altered, thus enabling the construction element 1 thereon to be adjusted to the desired level.

When the supporting element carries a construction element 1, e.g. just a beam 2 of concrete which per se causes a load of Q N, the beam 2 rests on the bearing part 6 while the clamping parts 17, 18 of the clamping plates 19, 20, 21, 22 press against the lateral surfaces 4, 5 of the beam, whereupon the clamping plates are in free engagement with the beam, i.e. the connection between them is loose. This clamping effect is achieved by the bearing part 6 of the supporting element being loaded by the beam 2 so that the bearing part 6 is bent down a short distance within the area of the inner section 7 at the same time as the clamping plates 19, 20, 21, 22 are moved toward each other as a result of this loading and resulting downward bending. The upwardly directed clamping plates 19, 20, 21, 22 also act as reinforcement for the outer sections 8, 9 of the bearing part 6 so that each outer section 8, 9 and its clamping plates 19, 20; 21, 22 form a movable unit that enables a strong clamping effect to be obtained upon loading of the inner section 7 of the bearing part 6. This inner section is thus not reinforced and is able to bend. As illustrated in FIG. 6 a bending axis 26 is formed in the bearing part 6 at the limit or transition between the inner, bendable section 7 and each reinforced outer section 8, 9 of the bearing part 6. The clamping action against the lateral surfaces 4, 5 of the beam arises as a result of a torsional moment appearing at each bending axis 26.

Figure 7:
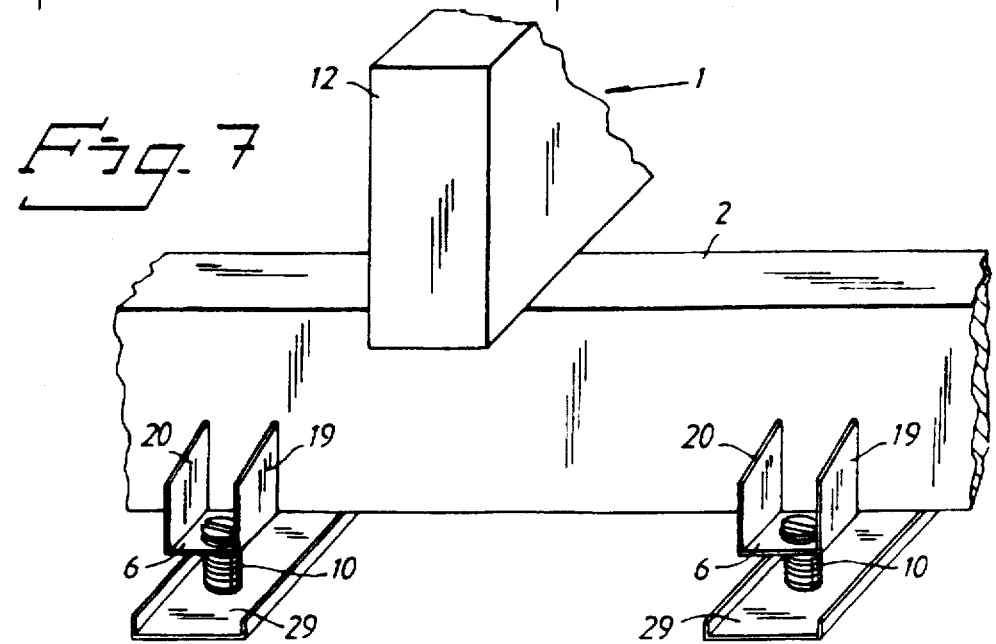
FIG. 7 is a perspective view of two supporting and levelling elements supporting and loaded by a construction consisting of a lower beam and a plurality of cross-beams.

FIG. 7 shows two supporting and levelling elements of the type described, arranged a suitable distance apart, to support and adjust the level of a construction 1 which consists of a lower beam 2, with which the supporting and levelling elements are in clamping engagement, and a plurality of transverse beams 12, only one of which is shown. The screws 10, 11 of each supporting and levelling element are placed freely on a firm support plate 29 in order to distribute the pressure on the surface and to facilitate turning the screws when adjusting the level of the construction 1. Such support plates 29 or other pressure-distributing aids are used when the supporting surface is in the form of particles, e.g. stones, sand, etc.

FIGS. 8 and 9 illustrate application of the invention to support and adjust the level of a pipe 30.

The mid-section 7 of the bearing part 6 is suitably thin enough to be bent manually, which is an advantage so that the space 16 can be temporarily enlarged to allow or facilitate application of the supporting element on the construction element 2. After application, the clamping members 14, 15 can be bent back, e.g. so that the construction element 2 is retained to the supporting element by means of the clamping action. In any case, the clamping members 14, 15 are brought into engagement with the construction element 2 when the bearing part 6 is bent downwardly upon loading in accordance with the principle of the invention.

FIG. 10 illustrates application of the invention to support a construction element 2 in the form of a screed which is an elongate non-deformable rail carrying equipment such as a vibrating bridge for levelling the surface of concrete spread for casting concrete floors and roofs. The rail 2 is preferably i profiled plate, in which case the contour of the space L6 is designed to fit the plate profile. The plate rail carries suitably a slip-strip (not shown) of a plastic material. In this latter case the mid-section 7 of the bearing part 6 is relatively small, e.g. only 2–4 mm depending on the thickness of the rail 2.

According to an alternative embodiment (not shown), the supporting element is formed by two or three parts, insertable into each other and lockable by means of suitable locking devices to give a firm support. The mid-section of the bearing part is bendable in accordance with the principle of the invention. The bearing part may comprise a first part in the form of a tongue, for instance, and a second part with opposing grooves or a space with slip surfaces to receive the tongue.

What is claimed is:

1. A device for supporting a construction on a supporting surface, the construction including at least one form stable construction element having a lower side and two lateral surfaces facing away from each other and being a predetermined distance apart and capable of applying a construction element load, said device comprising:

a bearing part having an upper side, an inner section, and two outer, bending resistant sections, one positioned on each side of the inner section;

a spacer extending from a lower side of said bearing part in each outer section, said spacers being positioned to keep said bearing part at a distance from the supporting surface; and upwardly directed, co-operating clamping members positioned on the upper side of said bearing part forming a stable unit therewith, said clamping members defining a space between them delimited by said inner section of said bearing part for receipt of the construction element;

said inner section being bendable by the influence of a construction element load; and said clamping members extending within each outer section and comprising at least one rigid clamping plate for engaging a construction element disposed in said space by pressing, in free engagement, against two lateral surfaces of the construction element with clamping forces generated by the construction element load on said bendable inner section.

2. A device as claimed in claim 1, wherein each clamping member comprises two substantially parallel clamping plates spaced from each other.

3. A device as claimed in claim 2, wherein a distance between the clamping plates is the same in the two pairs of clamping plates.

4. A device as claimed in claim 1, wherein said bearing part and clamping members are constructed from a flat sheet-metal blank punched with U-shaped lateral recesses corresponding to the shape of said space and bent along parallel scoring lines that coincide with a bottom edge of said U-shaped lateral recesses to form four clamping plates.

5. A device as claimed in claim 1, in combination with a said construction element.

6. A device as claimed in claim 5, wherein the bearing part comprises a unitary plate.

7. A device as claimed in claim 5, wherein said spacers are adjustable in relation to said bearing part to allow adjustable setting of a vertical level of said construction element.

8. A device as claimed in claim 7, wherein said spacers in each outer section comprise at least one screw in thread engagement with the outer section and extending vertically therethrough.

9. A device as claimed in claim 5, wherein each clamping member comprises at least two rigid clamping plates, and wherein a width of said space when said device is unloaded and said bearing part is undeflected is from close to 0 mm to 10 mm greater than the thickness of said construction element measured between said lateral surfaces against which the clamping plates press when said device is loaded.

10. A device as claimed in claim 9, wherein said width of the space when said device is unloaded and said bearing part is undeflected is from 1 mm to 5 mm greater than the thickness of said construction element measured between said lateral surfaces.

11. A device as claimed in claim 5, wherein said construction element comprises a screed to support equipment for surface leveling.

12. Apparatus comprising:

a device for supporting a construction on a supporting surface;

said construction including at least one form stable construction element; and said device comprising: a bearing frame having an opening sized to receive said construction element; a plurality of spacers extending from a lower side of said bearing frame and for supporting said bearing frame spaced from said supporting surface; and clamping members disposed on opposite sides of said opening and each comprising at least one flat panel having a front face, a back face and an edge, said edge being disposed facing said opening, and wherein said bearing frame is elastically bendable by the influence of a load applied by said construction element so that when the construction element is supported in said bearing frame, said bearing frame is bent by the influence of said construction element load causing said clamping members to freely engage and clamp said construction element.

13. A device as claimed in claim 12, wherein said spacers are adjustable in relation to said bearing frame to allow adjustable setting of a vertical level position of said construction element.

14. A device as claimed in claim 13, wherein said spacers comprise at least one screw in thread engagement with the bearing frame and extending vertically therethrough.

15. A device as claimed in claim 12, wherein each clamping member comprises two substantially parallel clamping plates spaced from each other.

16. A device as claimed in claim 15, wherein a distance between said clamping plates is the same in the two pairs of clamping plates.

17. A device as claimed in claim 12, wherein said bearing frame and clamping members are constructed from a flat sheet-metal blank punched with U-shaped lateral recesses corresponding to the shape of said opening and bent along parallel scoring lines that coincide with a bottom edge of said U-shaped lateral recesses to form four clamping plates.

18. A device as claimed in claim 12, wherein said construction element comprises a screed to support equipment for surface leveling.

\* \* \* \* \*